United States Patent [19]

Bainard

[11] 4,131,286
[45] Dec. 26, 1978

[54] SEAL AND METHOD FOR ATTACHING SEAL

[75] Inventor: Dean R. Bainard, Bethel Township; York County, S.C.

[73] Assignee: Garlock Inc., Rochester, N.Y.

[21] Appl. No.: 701,350

[22] Filed: Jun. 30, 1976

[51] Int. Cl.² ............................................. F16J 9/06
[52] U.S. Cl. .................................... 277/152; 277/181
[58] Field of Search ............... 277/181, 237, 153, 152, 277/182, 184

[56] References Cited

U.S. PATENT DOCUMENTS

| 2,568,056 | 9/1951 | Corder | 277/181 |
| 3,159,407 | 12/1964 | Strohm | 277/82 |
| 3,503,617 | 3/1970 | Williams | 277/181 |
| 3,606,363 | 9/1971 | Jordan | 277/237 |
| 3,827,703 | 8/1974 | Brink | 277/182 |

Primary Examiner—Robert I. Smith
Attorney, Agent, or Firm—Schovee & Boston

[57] ABSTRACT

A seal having at least one screw thread molded into the elastomeric mounting surface thereof. The mating surface of the housing can also be provided with at least one screw thread to mate with the screw thread(s) on the seal.

3 Claims, 1 Drawing Figure

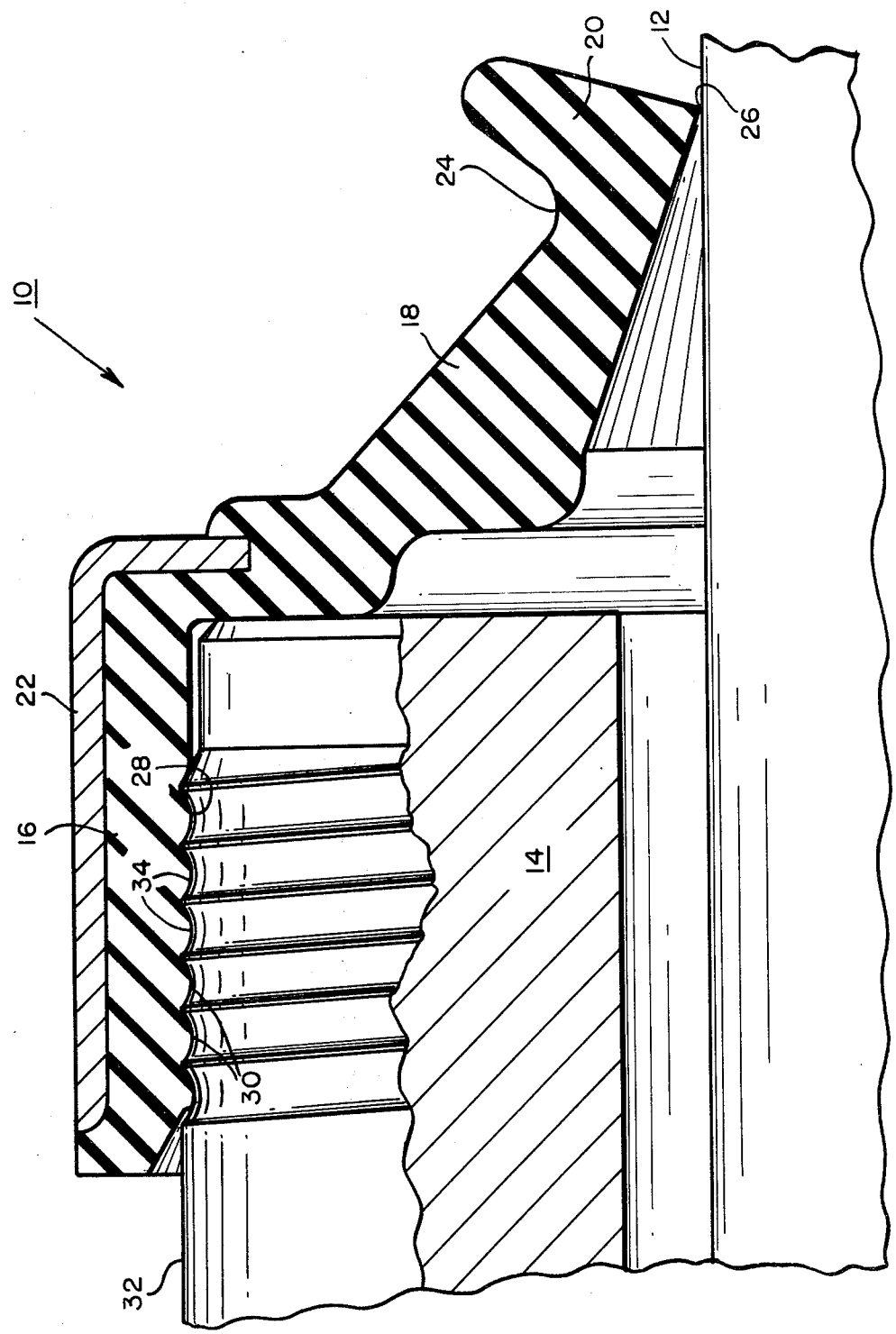

SEAL AND METHOD FOR ATTACHING SEAL

BACKGROUND OF THE INVENTION

1. Field of the Invention

This invention relates to seals and in particular to the attachment of seals to a housing.

2. Background of the Invention

In the seal art there are applications where a press-fitting tool to force the seal into place can not be used, and the seal must be fitted over a housing or into a bore by hand. Current practice requires a separate seal retainer which is threaded or bolted on.

It is an object of the present invention to overcome the disadvantages and problems in the above-mentioned prior art, and in particular to provide a seal and a method for attaching the seal that eliminates the need for a separate retainer. It is another object of the present invention to mold at least one screw thread onto the press-fit diameter, or mounting surface of a seal, whereby the seal can be "screwed" into the bore or onto the housing, and preferably also to provide the housing or bore with a mating screw thread.

SUMMARY OF THE INVENTION

By molding at least one screw thread onto the press-fit diameter or mounting surface of the reinforcing or mounting portion of an elastomeric seal, the seal can be "screwed" into or onto a mating screw thread of the housing, in applications where a press-fitting tool can not be used and previous practice required a separate seal retainer that had to be threaded or bolted into place.

BRIEF DESCRIPTION OF THE DRAWING

The present invention will be more fully understood by reference to the following detailed description thereof, when read in conjunction with the attached drawing wherein:

The FIGURE is a partial cross-sectional view through a seal according to a preferred embodiment of the present invention.

DETAILED DESCRIPTION OF THE PREFERRED EMBODIMENT

With reference now to the drawing, the FIGURE shows a seal 10 according to the present invention for sealing the space between a shaft 12 and a housing 14. The seal 10 is preferably made of elastomeric material and includes a reinforcing or mounting portion 16, a frusto-conical tapering portion 18 and a sealing lip portion 20. The reinforcing portion 16 preferably also includes an annular metal shell 22. The sealing lip portion 20 includes a groove 24 in which a garter spring may be used, if desired, and a sealing lip 26.

While according to the present invention, the seal 10 can include a mounting surface on either the O.D. or the I.D. of the mounting portion 16, in the preferred embodiment shown in the FIGURE the mounting surface is on the I.D. surface 28 of the mounting portion 16 of the seal. According to the present invention, at least one screw thread 30 is molded into the I.D. surface 28 of the mounting portion 16 during manufacture of the seal. Preferably also the O.D. surface 32 of the housing 14 is provided with at least one screw thread 34 mating with the screw thread 30 of the seal by, for example, finishing the housing with a screw thread having a rough turn lathe finish of, for example, 20 turns per inch. Preferably each of the screw threads 30 and 34 is identical in the number of screw threads (i.e. one, two, etc.) and each has the same number of turns per inch.

According to the present invention, the seal 10 is installed with a turning action by "screwing" the seal 10 onto the housing 14 such that the threads 30 and 34 matingly engaged with each other for positively retaining the seal in the application without, for example, the need for a separate seal retainer or a press-fitting tool to force the seal into place.

While as stated above, preferably the screw thread on the seal and on the housing have the same number of turns per inch, this is not essential. For example, the housing can have 24 and the seal 20 turns per inch and the seal material will be flexible enough that this mis-match will not affect the attachment of the seal to the housing because the elastomeric material will cross-thread and thus still provide a good and satisfactory attachment. Further, while 20 turns per inch was mentioned above, any number of turns per inch can be used, and any number of screw threads, whether single or multiple can be used. While the present invention is particularly useful in applications where no press-fitting tool can be used to force the seal into place and where previous practice required a separate seal retainer, the present invention is not limited to such applications, but can be used in other types of applications, even where, for example, a press-fitting tool can be used. Standard, known elastomeric materials, resins and plastics can be used in this invention. While one particular seal has been shown, any seal design can be used with the present invention of screw threads in the mounting surface of the mounting portion thereof.

The invention has been described in detail with particular reference to the preferred embodiments thereof, but it will be understood that variations and modifications can be effected within the spirit and scope of the invention as described hereinabove and as defined in the appended claims.

I claim:

1. Apparatus comprising a unitary seal attached to a housing, said seal including an integral mounting portion and sealing portion, said sealing portion including a sealing lip portion, both of said portions being made of elastomeric material and said mounting portion having at least one elastomeric, molded screw thread on a mounting surface thereof, said housing having at least one screw thread on a corresponding mounting surface thereof, said seal being attached to said housing by said screw-threaded surfaces being in screw threaded contact with each other, and said screw thread of said mounting portion having a different number of threads per inch than said screw thread of said housing, whereby the mis-match in the number of screw threads causes the screw thread on the mounting portion to cross-thread while still providing a good and satisfactory attachment.

2. The apparatus according to claim 1 wherein said housing is located such that there is not sufficient space available to use a press-fitting tool to attach said seal to said housing.

3. The apparatus according to claim 1 wherein said screw thread on said housing has 24 turns per inch and said screw thread on said mounting portion has 20 turns per inch.

* * * * *

Disclaimer 4,131,286.—*Dean R. Bainard*, Bethel Township, York County, S.C. SEAL AND METHOD FOR ATTACHING SEAL. Patent dated Dec. 26, 1978. Disclaimer filed June 17, 1980, by the assignee, *Garlock Inc.*

Hereby enters this disclaimer to claims 1, 2 and 3 of said patent.

[*Official Gazette November 25, 1980.*]